US009541950B2

(12) United States Patent
Huang et al.

(10) Patent No.: US 9,541,950 B2
(45) Date of Patent: Jan. 10, 2017

(54) MULTI-SCREEN DISPLAY APPARATUS AND METHOD FOR ELIMINATING SIGNAL INTERFERENCES IN MULTI-SCREENS

(71) Applicants: BOE TECHNOLOGY GROUP CO., LTD., Beijing (CN); BEIJING BOE VISION-ELECTRONIC TECHNOLOGY CO., LTD., Beijing (CN)

(72) Inventors: Weijun Huang, Beijing (CN); Daliang Shen, Beijing (CN)

(73) Assignees: BOE TECHNOLOGY GROUP CO., LTD., Beijing (CN); BEIJING BOE VISION-ELECTRONICS TECHNOLOGY CO., LTD., Beijing (CN)

( * ) Notice: Subject to any disclaimer, the term of this patent is extended or adjusted under 35 U.S.C. 154(b) by 171 days.

(21) Appl. No.: 14/375,360

(22) PCT Filed: Dec. 14, 2013

(86) PCT No.: PCT/CN2013/089454
§ 371 (c)(1),
(2) Date: Jul. 29, 2014

(87) PCT Pub. No.: WO2015/003463
PCT Pub. Date: Jan. 15, 2015

(65) Prior Publication Data
US 2016/0154421 A1 Jun. 2, 2016

(30) Foreign Application Priority Data
Jul. 9, 2013 (CN) .......................... 2013 1 0286427

(51) Int. Cl.
*H05K 7/00* (2006.01)
*H05K 5/00* (2006.01)
(Continued)

(52) U.S. Cl.
CPC .............. *G06F 1/16* (2013.01); *G06F 3/1423* (2013.01); *G09G 2300/0426* (2013.01); *G09G 2330/06* (2013.01)

(58) Field of Classification Search
CPC ....................................................... G06F 21/00
(Continued)

(56) References Cited

U.S. PATENT DOCUMENTS 5,471,175 A 11/1995 Chiu et al.
7,068,098 B1 6/2006 Bell et al.
(Continued)

FOREIGN PATENT DOCUMENTS

CN 101650483 A 2/2010
CN 101740536 A 6/2010
(Continued)

OTHER PUBLICATIONS

Written Opinion of the International Searching Authority dated Mar. 17, 2014; PCT/CN2013/089454.
First Chinese Office Action Appln. No. 201310286427; Dated Jul. 3, 2015.
Zhao Jin-kui, "Common Mode Interference & Differential Mode Interference and their Restraining Technologies", Certification & EMC, May 2006; pp. 72-76.
Second Chinese Office Action Appln. No. 201310286427.8; Dated Nov. 23, 2015.
International. Search Report Appln. No. PCT/CN2013/089454; Dated Mar. 14, 2014.
Third Chinese Office Action dated May 16, 2016; Appln. No. 201310286427.8.

*Primary Examiner* — Jerry Wu
(74) *Attorney, Agent, or Firm* — Ladas & Parry LLP

(57) ABSTRACT

The present disclosure relates to a display technique and provides a multi-screen display apparatus comprising a plurality of display screens, wherein small signal earth wires of the plurality of display screens are connected with each other, large signal earth wires of the plurality of display screens are connected with each other, the small signal earth wires cause small signal grounds of the respective display screens to be connected with each other, and the large signal earth wires cause large signal grounds of the respective display screens to be connected with each other. The plurality of display screens share one power supply, and common-mode choke coils are disposed at signal input terminals (Continued)

1- first display screen;
2- second display screen;
3- middle axis
4- power supply
5- signal source
11- signal board for first display screen
12- small signal earth wire for first display screen
13- large signal earth wire for first display screen
14- first common-mode choke coil
21- signal board for second display screen
22- small signal earth wire for second display screen
23- large signal earth wire for second display screen
24- second common-mode choke coil
31- earth wire lock component of signal boards of the plurality of display screens. The present disclosure further provides a method for eliminating signal interferences in multi screens based on the multi-screen display apparatus. The small signal earth wires of the plurality of display screens are connected together and the large signal earth wires of the plurality of display screens are connected together, respectively, which eliminates potential differences among the plurality of display screens, so that a mura interference phenomenon due to an adjustment of brightness or contrast among the plurality of display screens is eliminated. Furthermore, a common-mode interference due to sharing of the power supply may be eliminated by adding the common-mode choke coil at the signal input terminal of the signal board of each display screen.

18 Claims, 2 Drawing Sheets

(51) Int. Cl.
*G06F 1/16* (2006.01)
*G06F 3/14* (2006.01)

(58) Field of Classification Search
USPC .................................................. 361/679.01
See application file for complete search history.

(56) References Cited

U.S. PATENT DOCUMENTS

| 2004/0100233 | A1* | 5/2004 | Ouyang | H02M 3/00 |
| | | | | 323/272 |
| 2010/0064244 | A1* | 3/2010 | Kilpatrick, II | G06F 1/1616 |
| | | | | 715/773 |
| 2010/0123226 | A1 | 5/2010 | Chen et al. | |
| 2013/0081106 | A1* | 3/2013 | Harata | G06F 21/554 |
| | | | | 726/2 |
| 2013/0314003 | A1 | 11/2013 | Zhou et al. | |

FOREIGN PATENT DOCUMENTS

| CN | 201523224 U | 7/2010 |
| CN | 201628856 A | 11/2010 |
| CN | 102623215 A | 8/2012 |
| CN | 103345374 A | 10/2013 |
| CN | 103426411 A | 12/2013 |
| CN | 203324965 U | 12/2013 |

* cited by examiner

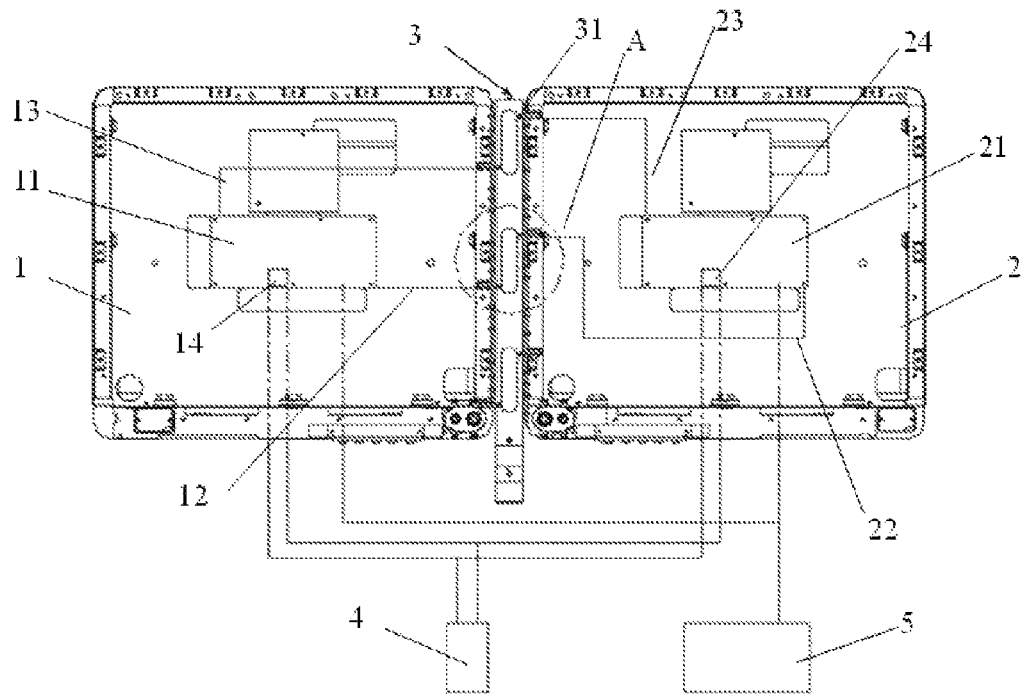

1- first display screen;
2- second display screen;
3- middle axis
4- power supply
5- signal source
11- signal board for first display screen
12- small signal earth wire for first display screen
13- large signal earth wire for first display screen
14- first common-mode choke coil
21- signal board for second display screen
22- small signal earth wire for second display screen
23- large signal earth wire for second display screen
24- second common-mode choke coil
31- earth wire lock component

Fig. 1

31 - earth wire lock component
311 - earth wire lock

MULTI-SCREEN DISPLAY APPARATUS AND METHOD FOR ELIMINATING SIGNAL INTERFERENCES IN MULTI-SCREENS

TECHNICAL FIELD

The present disclosure relates to a field of display technique, and more particularly, to a multi-screen display apparatus and a method for eliminating signal interferences in the multi screens.

BACKGROUND

Currently, a computer is normally equipped with one display having a single-screen, but when a plurality of windows are required to be opened, they have to be switched on the display and are crowded, especially in a case in which analysis of graphs or a testing of programs is performed, the single-screen display is not suitable any more. Therefore a multi-screen (dual-screen or more than two screens) display appears. However, there are potential differences among the multi screens and pictures would render a mura phenomenon; Further, for the display with the multi screens sharing one power supply, it tends to occur mutual signal interferences among the multi screens.

SUMMARY

A technical problem to be solved by the present disclosure is how to eliminate a potential difference interference phenomenon among multi screens.

In order to solve the above technical problem, the present disclosure provides a multi-screen display apparatus comprising a plurality of display screens, wherein small signal earth wires of the plurality of display screens are connected with each other, large signal earth wires of the plurality of display screens are connected with each other, the small signal earth wires cause small signal grounds of the respective display screens to be connected with each other, and the large signal earth wires cause large signal grounds of the respective display screens to be connected with each other.

Optionally, the plurality of display screens share one power supply, and common-mode choke coils are disposed at signal input terminals of signal boards of the plurality of display screens, respectively.

Optionally, two adjacent display screens among the plurality of display screens are connected with each other by a middle axis.

Optionally, at least two groups of earth wire lock components are disposed on the middle axis, and each group of the earth wire lock components comprises two earth wire locks connected electrically; the small signal earth wires of the two adjacent display screens are connected to the earth wire locks of one group of earth wire lock components, respectively; and the large signal earth wires of the two adjacent display screens are connected to the earth wire locks of the other group of earth wire lock components, respectively.

Optionally, the earth wire locks are made of metal materials with a low impedance.

Optionally, a number of the display screens is two.

The present disclosure further provides a method for eliminating signal interferences in multi screens, comprising: connecting small signal earth wires of a plurality of display screens with each other, connecting large signal earth wires of the plurality of display screens with each other, so that small signal grounds and large signal grounds of the plurality of display screens are at same equal potentials respectively, wherein the small signal earth wires cause the small signal grounds of the respective display screens to be connected with each other, and the large signal earth wires cause the large signal grounds of the respective display screens to be connected with each other.

Optionally, the plurality of display screens share one power supply, and common-mode choke coils are disposed at signal input terminals of signal boards of the plurality of display screens, respectively.

Optionally, a middle axis is disposed between two adjacent display screens, at least two groups of earth wire lock components are disposed on the middle axis, and each group of the earth wire lock components comprises two earth wire locks connected electrically; the small signal earth wires of the two adjacent display screens are connected to the earth wire locks of one group of earth wire lock components, respectively; and the large signal earth wires of the two adjacent display screens are connected to the earth wire locks of the other group of earth wire lock components, respectively.

Optionally, a number of the display screens is two.

In the multi-screen display apparatus and the method for eliminating signal interferences in the multi screens and a multi-screen display comprising the multi-screen display apparatus according to above solutions, the small signal earth wires of the plurality of display screens are connected together and the large signal earth wires of the plurality of display screens are connected together, which eliminates the potential differences among the plurality of display screens, so that the mura interference phenomenon due to an adjustment of brightness or contrast among the plurality of display screens is eliminated.

Optionally, a common-mode interference due to sharing of the power supply may be eliminated by adding the common-mode choke coil at the signal input terminal of the signal board of each display screen.

BRIEF DESCRIPTION OF THE DRAWINGS

FIG. 1 is an exemplary view illustrating a structure of a multi-screen display apparatus according to one embodiment of the present disclosure.

Figure 2:
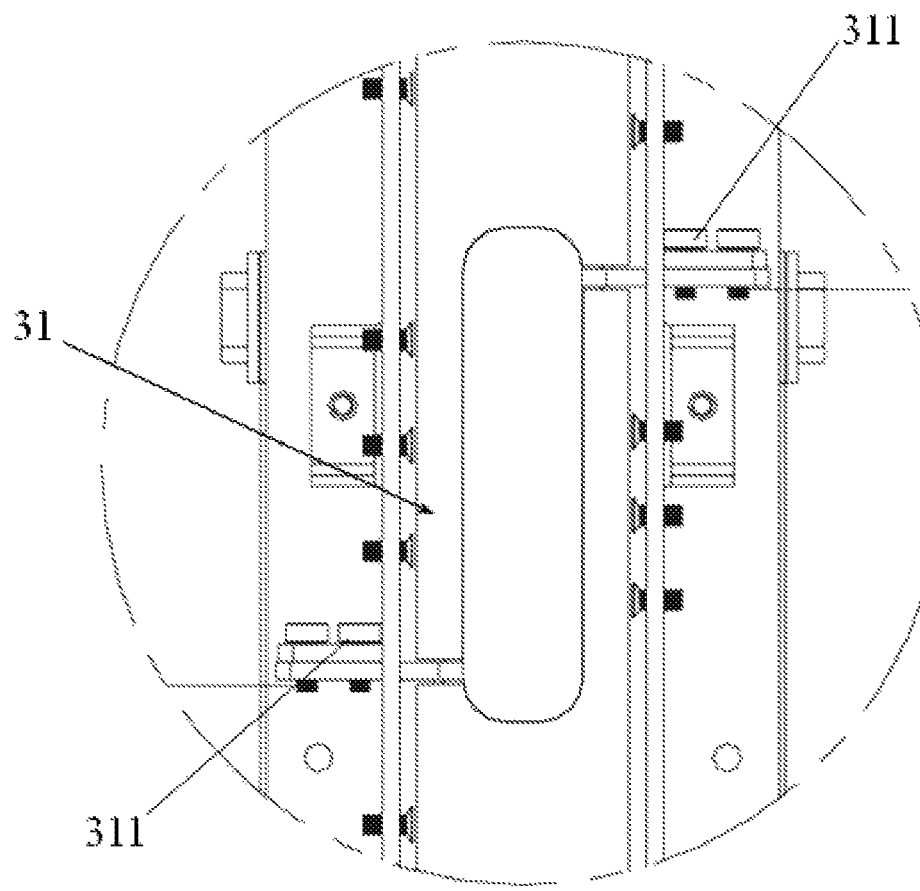
FIG. 2 is an enlarged view of area A in FIG. 1.

Reference Signs in Figs.: 1—first display screen; 11—signal board for first display screen; 12—small signal earth wire for first display screen; 13—large signal earth wire for first display screen; 14—first common-mode choke coil; 2—second display screen; 21—signal board for second display screen; 22—small signal earth wire for second display screen; 23—large signal earth wire for second display screen; 24—second common-mode choke coil; 3—middle axis; 31—earth wire lock component; 311—earth wire lock; 4—power supplier; 5—signal source.

DETAILED DESCRIPTION

Detailed implementations of the present disclosure would be further described in detail below in connection with drawings and embodiments. Following embodiments are only used to explain the present disclosure, but not to limit a scope of the present disclosure.

A multi-screen display apparatus according to the present disclosure comprises a plurality of display screens, wherein small signal earth wires of the plurality of display screens are connected with each other, large signal earth wires of the plurality of display screens are connected with each other, whereby potential differences among the plurality of display screens are eliminated, so that the mura phenomenon due to an adjustment of brightness or contrast among the plurality of display screens is eliminated. Herein, the small signal earth wires cause small signal grounds to be connected with each other, and the large signal earth wires cause large signal grounds to be connected with each other. The small signal ground refers to an analog signal transferred to the display from a host, and the large signal ground refers to a negative electrode of a power supply through which a strong current passes.

Optionally, the plurality of display screens according to the present disclosure share one power supply, and common-mode choke coils are disposed at signal input terminals of signal boards of the plurality of display screens, respectively. A common-mode interference due to sharing of the power supply can be eliminated by adding the common-mode choke coil at the signal input terminal of the signal board of each display screen In an example, two adjacent display screens among the plurality of display screens according to the present disclosure are connected with each other by a middle axis. At least two groups of earth wire lock components are disposed on the middle axis, and each group of the earth wire lock components comprises two earth wire locks connected electrically; the small signal earth wires of the two adjacent display screens are connected to the earth wire locks of one group of earth wire lock components, respectively; and the large signal earth wires of the two adjacent display screens are connected to the earth wire locks of the other group of earth wire lock components, respectively. Optionally, the earth wire locks on the middle axis are made of metal materials with a low impedance.

As illustrated in FIG. 1, which shows an embodiment of the present disclosure, there are configured two display screens, that is, a first display screen 1 and a second display screen 2. The first display screen 1 and the second display screen 2 share one power supplier 4 and one signal source 5, wherein the signal source 5 is a VGA signal (analog) outputted from a host, the small signal earth wire is connected with the signal source, and the large signal earth wire is connected with a negative electrode of the power supplier; wherein, the first display screen 1 and the second display screen 2 are connected with each other by means of the middle axis 3, the first common-mode choke coil 14 is disposed at the signal input terminal of the signal board 11 of the first display screen, and the second common-mode choke coil 24 is disposed at the signal input terminal of the signal board 21 of the second display screen.

Two groups of earth wire lock components 31 are disposed on the middle axis 3, and each group of earth wire lock components 31 comprises two earth wire locks 311 connected electrically, as illustrated in FIG. 2. The small signal earth wire 12 of the first display screen and the small signal earth wire 22 of the second display screen are connected to the respective earth wire locks 311 of one group of earth wire lock components; while the large signal earth wire 13 of the first display screen and the large signal earth wire 23 of the second display screen are connected to the respective earth wire locks 311 of the other group of earth wire lock components. The earth wire locks 311 on the middle axis are made of metal materials with a low impedance.

The present disclosure further provides a method for eliminating signal interferences in multi screens based on the multi-screen display apparatus described above, comprising: connecting small signal earth wires of a plurality of display screens with each other, connecting large signal earth wires of the plurality of display screens with each other, so that small signal grounds and large signal grounds of the plurality of display screens are at same equal potentials respectively, wherein the small signal earth wires cause the small signal grounds of the respective display screens to be connected with each other, and the large signal earth wires cause the large signal grounds of the respective display screens to be connected with each other. The large signal earth wires or the small signal earth wires may be directly connected electrically, or may be indirectly connected via the earth wire lock components on the middle axis between the display screens. When the connection is implemented with the earth wire lock components, the earth wire locks of the earth wire lock components are made of the metal materials with a low impedance, so that the large signal earth wires and the small signal earth wires are equivalent to be connected to a ground wire.

In an example, the plurality of display screens share one power supply, and the common-mode choke coils are disposed at the signal input terminals of the signal boards of the plurality of display screens, respectively.

Optionally, as illustrated in FIG. 1, there are configured two display screens. The small signal earth wire 12 of the first display screen is connected with the small signal earth wire 22 of the second display screen, so that the small signal ground of the first display screen and that of the second display screen are at a same equal potential; meanwhile, the large signal earth wire 13 of the first display screen is connected with the large signal earth wire 23 of the second display screen, so that the large signal ground of the first display screen and that of the second display screen are at a same equal potential.

Optionally, the first common-mode choke coil 14 is disposed at the signal input terminal of the signal board 11 of the first display screen, and meanwhile the second common-mode choke coil 24 is disposed at the signal input terminal of the signal board 21 of the second display screen.

In the multi-screen (for example, the dual-screen) display apparatus and the solution for eliminating signal interferences in the multi screens based on the multi-screen display apparatus according to the present disclosure, the small signal earth wires of the plurality of display screens are connected together and the large signal earth wires of the plurality of display screens are connected together, which eliminates the potential differences among the plurality of display screens, so that the mura phenomenon due to an adjustment of brightness or contrast among the plurality of display screens is eliminated.

Optionally, the common-mode interference phenomenon due to sharing of the power supply between the multi screens can be eliminated by adding the common-mode choke coil at the signal input terminal of the signal board of each display screen The above descriptions only illustrate certain specific embodiments of the present invention, and it should note that, for those ordinary skilled in the art, many variations and substitutions can be made without departing from the technical principle of the present invention. Thus, such variations and substitutions should be considered to fall into the protection scope of the present invention.

What is clamed is:
1. A multi-screen display apparatus comprising:
a plurality of display screens,
small signal earth wires of the plurality of display screens that are connected with each other, and large signal earth wires of the plurality of display screens that are connected with each other, wherein the small signal earth wires are configured to cause small signal grounds of respective display screens to be connected with each other in which small signal grounds correspond to analog signals that are transferred from a signal source outputted from a host to respective display screens, and wherein the large signal earth wires are configured to cause large signal grounds of respective display screens to be connected with each other in which large signal grounds correspond to a current that passes from a negative electrode of a power supply to respective display screens, wherein the plurality of display screens share the power supply and the signal source, the small signal earth wires are connected to a ground of the signal source, and the large signal earth wires are connected to the negative electrode of the power supply.

2. The multi-screen display apparatus of claim 1, further comprising common-mode choke coils that are disposed at signal input terminals of signal boards of the plurality of display screens.

3. The multi-screen display apparatus of claim 1, wherein two adjacent display screens among the plurality of display screens are connected to each other at a middle axis of the multi-screen display apparatus.

4. The multi-screen display apparatus of claim 3,
further comprising at least two earth wire lock components disposed along the middle axis of the multi-screen display apparatus, wherein each of the at least two earth wire lock components comprises two earth wire locks connected electrically;

the small signal earth wires of two adjacent display screens are connected to the two earth wire locks of one of the at least two earth wire lock components respectively, and the large signal earth wires of two adjacent display screens are connected to the two earth wire locks of another one of the at least two earth wire components respectively.

5. The multi-screen display apparatus of claim 4, wherein the earth wire locks are made of metal materials.

6. The multi-screen display apparatus of claim 1, wherein a number of the display screens is two.

7. A method for eliminating signal interferences in multi screens, comprising:

connecting small signal earth wires of a plurality of display screens to each other, connecting large signal earth wires of the plurality of display screens to each other, wherein the small signal earth wires are configured to cause the small signal grounds of respective display screens to be connected to each other in which small signal grounds correspond to analog signals that are transferred from a signal source outputted from a host to respective display screens, and wherein the large signal earth wires are configured to cause the large signal grounds of the respective display screens to be connected to each other in which large signal grounds correspond to a current that passes from a negative electrode of a power supply to respective display screens, wherein the plurality of display screens are configured to share the power supply and the signal source, the small signal earth wires are connected to a ground of the signal source, and the large signal earth wires are connected to the negative electrode of the power supply.

8. The method of claim 7, wherein common-mode choke coils are disposed at signal input terminals of signal boards of the plurality of display screens.

9. The method of claim 7,
wherein a middle axis is disposed between two adjacent display screens, and at least two earth wire lock components are disposed along the middle axis, each of the at least two earth wire lock components comprises two earth wire locks connected electrically;

the small signal earth wires of two adjacent display screens are connected to the two earth wire locks of one of the at least two earth wire lock components respectively, and the large signal earth wires of two adjacent display screens are connected to the two earth wire locks of another one of the at least two earth wire lock components respectively.

10. The method of claim 7, wherein a number of the display screens is two.

11. The method of claim 8,
wherein a middle axis is disposed between two adjacent display screens and at least two earth wire lock components are disposed along the middle axis;

each of the at least two earth wire lock components comprises two earth wire locks connected electrically;

the small signal earth wires of two adjacent display screens are connected to the two earth wire locks of one of the at least two earth wire lock components respectively, and the large signal earth wires of two adjacent display screens are connected to the two earth wire locks of another one of the at least two earth wire lock components respectively.

12. The multi-screen display apparatus of claim 2, wherein two adjacent display screens among the plurality of display screens are connected to each other at a middle axis of the multi-screen display apparatus.

13. The multi-screen display apparatus of claim 12,
wherein at least two earth wire lock components are disposed along the middle axis, each of the at least two earth wire lock components comprises two earth wire locks connected electrically;

the small signal earth wires of two adjacent display screens are connected to the two earth wire locks of one of the at least two earth wire lock components respectively, and the large signal earth wires of two adjacent display screens are connected to the two earth wire locks of another one of the at least two earth wire lock components respectively.

14. The multi-screen display apparatus of claim 13, wherein the earth wire locks are made of metal materials.

15. The multi-screen display apparatus of claim 2, wherein a number of the display screens is two.

16. The method of claim 8, wherein a number of the display screens is two.

17. The method of claim 9, wherein a number of the display screens is two.

18. The method of claim 11, wherein a number of the display screens is two.

* * * * *